Nov. 4, 1969  R. D. MOORE  3,476,493
FLOATING FISH CALLER
Filed Sept. 5, 1967
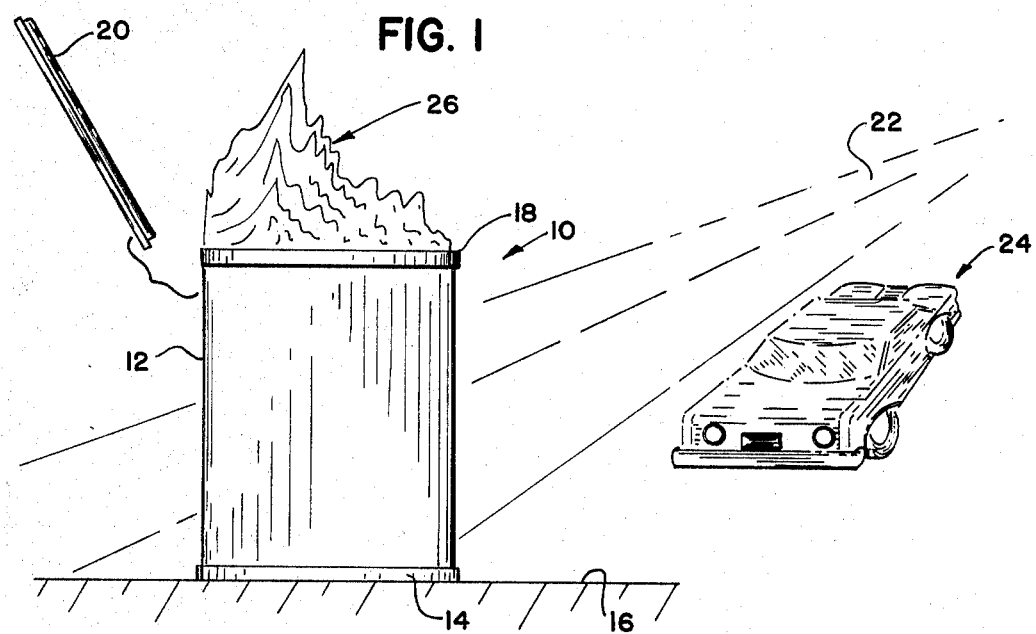
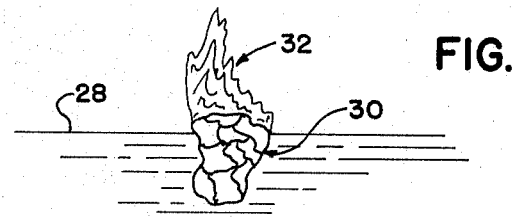
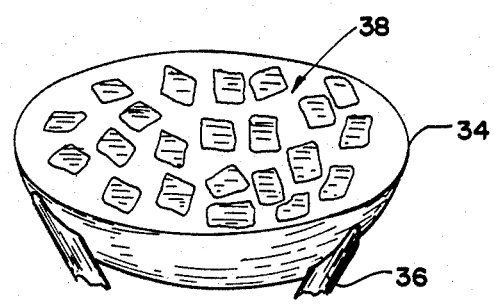
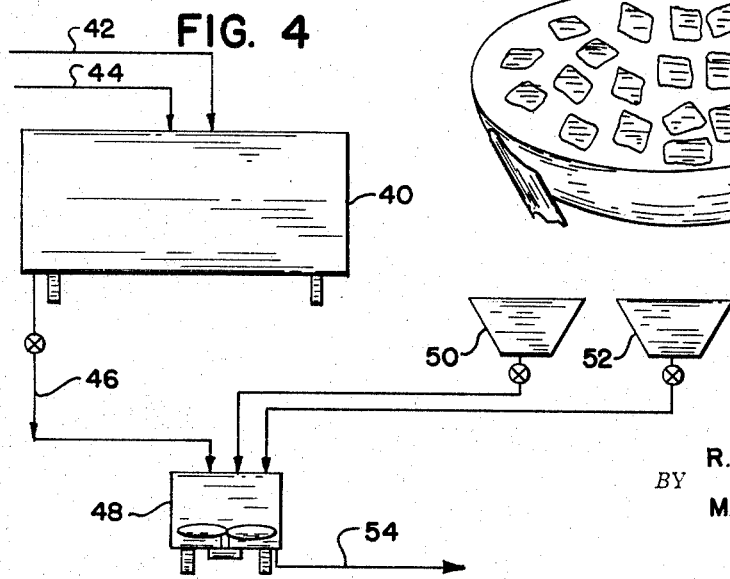
INVENTOR
R. D. MOORE
BY MARCUS L. BATES

United States Patent Office 3,476,493
Patented Nov. 4, 1969

3,476,493
FLOATING FISH CALLER
R. D. Moore, P.O. Box 1272, Jacksonville, Tex. 75766
Filed Sept. 5, 1967, Ser. No. 665,543
Int. Cl. F23b 5/00; A01k 97/00
U.S. Cl. 431—126                                    3 Claims

ABSTRACT OF THE DISCLOSURE

A floating fish caller comprised of a flambeau made of a gelatinous hydrocarbon mixture which burns in air to provide illumination from a controlled combustion. The floating flambeau includes a petroleum hydrocarbon solvent which is mixed together with a fatty acid soap to provide a gelled fuel which is relatively insoluble in water, and has a density less than water. During manufacture, the ingredients of the gelled fuel are allowed to congeal within a container to thereby provide a large mass of gelled fuel. A small mass of the fuel may be carefully removed from the container and placed upon the surface of water, whereupon the smaller mass of congealed fuel will float while at the same time remaining together in a ball-like mass to thereby provide a floating flambeau for attracting or calling fish. The gelled fuel, while within the container also provides an emergency light since the surface thereof can be ignited by merely removing the lid therefrom.

BACKGROUND OF THE INVENTION

The use of illuminating means at night in order to attract fish to close proximity of the fisherman's baited hook is an old expedient. Illuminating means of the prior art include lanterns, flash-lights, or torches which are generally placed above the water and near the fisherman. These expedients, if not properly employed, sometime frighten the fish away rather than attract them. Accordingly, the proper use of illuminating means of the prior art when used in conjunction with night fishing requires a special knowledge of the habits of fish.

SUMMARY

It is desirable to provide an illuminating means which may be employed at night in order to attract fish to a predetermined area to enable a fisherman to readily catch the fish.

It is also desirable to illuminate a limited surface area of a body of water in an improved and economical manner.

Therefore, a primary object of the present invention is to provide a floating fish caller which will float upon the surface of a body of water while burning to thereby attract fish.

Another object of the present invention is to provide an inexpensive floating flambeau which will readily burn while floating on the water surface.

A still further object of the present invention is the provision of a floating fish caller which attracts fish to a predetermined area by the utilization of a gelled fuel which remains in a congealed mass of any predetermined size while burning upon the surface of the water.

A further object of the present invention is the provision of a container of gelled fuel which enables small masses thereof to be removed from the container and directly placed upon the surface of a body of water, whereupon subsequent ignition thereof provides an illuminated floating fish caller.

The above objects and desires are attained in accordance with the present invention by the provision of a floating flambeau made in accordance with the above objects.

BRIEF DESCRIPTION OF THE DRAWINGS

FIGURE 1 is a part perspective, part diagrammatical representation showing one means by which the present invention may be practiced;

FIGURE 2 is a diagrammatical representation in cross-section of still another means of practicing the present invention;

FIGURE 3 is a fragmentary view diagrammatically setting forth another use of the present invention;

FIGURE 4 is a partly diagrammatical, partly schematical representation of one means by which the fuel of the present invention may be prepared.

BRIEF DESCRIPTION OF THE PREFERRED EMBODIMENTS

FIGURE 1 shows a flambeau, generally indicated by the arrow at numeral 10, which is comprised of an upwardly opening container 12 having a base 14 to enable the container to rest upon a level surface 16. The top 18 cooperates with a lid 20 to thereby seal the contents thereof in the usual manner. Numeral 22 indicates a highway upon which a vehicle, such as seen at numeral 24, may be driven in the usual manner. The flambeau 10, when ignited, provides controlled combustion as evidenced by a flame generally illustrated by the arrow at numeral 26. As seen in FIGURE 2, a portion of the fuel 30, which was previously contained within the container 12, may be removed and placed upon the surface of the water 28 and thereafter ignited to provide a flame as generally illustrated by the arrow at numeral 32. The burning mass of fuel may therefore be said to provide a floating fish caller in the form of a floating flambeau. It will be noted that the floating flambeau requires no structure other than the fuel itself.

As seen in FIGURE 3, a charcoal grill 34, suitably suspended by legs 36 which generally rest upon the surface of the ground, is provided with charcoal briquettes 38. The congealed fuel, as seen at 30, may be used to ignite the charcoal by coating a few briquettes therewith, if desired.

Looking now to the details of FIGURE 4, there is seen a holding tank 40 having inlet flow conduits 42 and 44. A valved outlet conduit 46 transfers fluid from container 40 into a smaller mixing tank 48. Hoppers 50 and 52 are provided with suitable valve means and flow conduits for transferring dry material from the hopper interior into the mixing tank. The mixing tank is provided with an outlet 54.

OPERATION

The floating fish caller of the present invention is best made by adding a gelling agent to a liquid hydrocarbon and placing the resulting liquid mixture into a container, such as seen at 12, prior to the conversion of the liquid into a gel. This expedient provides the container with a fuel contained therein in the form of a jelly-like body which more or less conforms to the configuration of the can. The nature of the gelled fuel permits the surface thereof to be ignited in a manner as seen in FIGURE 1 to thereby provide a flambeau 10 which may be used as an emergency light such as may be required at night by a vehicle which finds itself inoperative upon the open highway 22. However, the invention more particularly resides in the use of a portion of the gelled fuel as a floating fish caller.

Since the gelled fuel of the present invention can be removed from the container 12 by merely scooping out an individual mass 30, the fisherman can place the mass upon the surface of the water, whereupon the mass will float in the indicated manner of FIGURE 2. After placing a mass of the gelled fuel on the water, ignition thereof will provide a flame 32. The flame will continue to burn until the mass is either consumed by combustion or deliberately submerged in the water. This phenomenon enables the gel to be placed about a boat, for example, whereupon insects will naturally be attracted to the flame. The insects, upon flying into the flame, become injured, and subsequently fall to the surface of the water. Fish are also attracted to the floating fish caller, and upon approaching the illuminated area provided by the flame, will discover the injured insects and begin to devour them. As the fish consume the insects, they will eventually devour the lure, or the fish bait, thereby becoming the property of the fisherman.

The gelled fuel also finds utility as a charcoal igniting means. A small portion of the gelled fuel can be smeared on the surface of charcoal, as shown in the charcoal barbecuing device of FIGURE 3, to thereby enable ignition of the individual charcoal briquettes.

The gelled fuel is best prepared by flowing two hundred and seventy gallons of naphtha gasoline through flow line 42, into holding tank 40; and flowing two hundred and eighty-two gallons of white gasoline through flow line 44, into the holding tank. Aluminum octoate in the dry form is placed within the hopper 50, and "Cryogell 22" in the dry form is placed within the hopper 52 (available from Mallinchrodt Chemical Company, Chicago, Ill.). It has been found advantageous to prepare the gelled fuel in fifteen gallon batches in order to allow sufficient time to "can" the fuel prior to the final gelling action. Each batch is best prepared by flowing fifteen gallons of liquid hydrocarbon mixture contained within the holding tank 40 into the mixer 48. The agitator is started, and two pounds of aluminum octoate transferred from hopper 50 into the mixer. While vigorously agitating, three and one-half pounds of "Cyrogell 22" is transferred from hopper 52 into the mixer. Immediately upon suitable mixing of the chemicals, containers 12 are filled by means of flow line 54, with the operation being carried out rapidly so as to preclude final gelling of the fuel prior to the last can being filled. The individual cans are left undisturbed until the final gelling action has taken place.

When it is deemed desirable, the gelled fuel may be imparted with an attractive color. This expedience may be attained by mixing four ounces of red enamel paint in the mixer prior to adding the aluminum octoate. Other colors may be selected as desired. The fuel may be further modified by adding powdered aluminum and magnesium thereto in order to provide variation in intensity and color of the flame.

As a specific example of practicing the present invention, assume a fisherman to be fishing upon the waters as indicated by the numeral 28. A small mass of the gelled hydrocarbon may be removed from the container 12 by scooping out an undisturbed smaller body or mass of the gel from the container and gently placing the mass upon the surface of the water. The floating mass may now be ignited with a match to provide a flame 32. The flame will burn for a sufficient length of time to enable the average fisherman to catch an ample supply of fish, assuming fish to be in the general area of the fisherman. The flame may be extinguished by forcing the mass of gel below the surface of the water, whereupon the absence of oxygen will starve the flame. The mass 30 which remains unburned may be replaced into the container 12 if desired. It should be pointed out that the mass 30 will continue to burn, even in rough water or during a rain storm.

The foregoing is considered as illustrative only of the principles of the invention. Further, since numerous modifications and changes will readily occur to those skilled in the art, it is not desired to limit the invention to the exact example shown and described, and accordingly all suitable modifications and equivalents may be resorted to, falling within the scope of the invention as claimed.

I claim:
1. A fish caller which includes a floating flambeau for providing illumination, said flambeau comprised of a discrete mass of a gelled hydrocarbon fuel which burns in air to provide a controlled combusion;
    said fuel including a petroleum hydrocarbon solvent mixed together with a fatty acid soap and finely divided aluminum and magnesium to thereby provide a gelled fuel which is relatively insoluble in water, and which burns with variations in color and flame intensity;
    said fuel having a density less than water, to enable a mass of the fuel to be formed into a body which will float upon the water while burning to thereby provide a floating fish caller.
2. The floating flambeau of claim 1 and further including a container, the gelled fuel is allowed to become gelled in said container; whereby:
    a portion of the fuel may be removed from the container as a body and placed directly upon the surface of water and subsequently ignited to thereby provide said floating fish caller.
3. The floating flambeau of claim 2, wherein said container is defined by an upwardly opening wall, a closure means on top of said container; whereby:
    removal of said closure means enables the fuel to be ignited to thereby provide an emergency light.

References Cited
UNITED STATES PATENTS

| | | | |
|---|---|---|---|
| 2,168,698 | 8/1939 | Bunt et al. | 431—291 |
| 2,234,903 | 3/1941 | Muench | 431—288 X |
| 2,618,536 | 11/1952 | Hunn. | |
| 2,671,330 | 3/1954 | Ajello | 431—291 X |
| 3,323,883 | 6/1967 | Hotten. | |

CHARLES J. MYHRE, Primary Examiner

U.S. Cl. X.R.
43—17.5; 431—291